United States Patent
Forlenza et al.

(10) Patent No.: US 7,855,800 B2
(45) Date of Patent: Dec. 21, 2010

(54) APPARATUS AND METHOD FOR PROVIDING PRINTER SEPARATOR PAGES

(75) Inventors: Randolph Michael Forlenza, Austin, TX (US); John Paul Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 12/134,550

(22) Filed: Jun. 6, 2008

(65) Prior Publication Data

US 2008/0232892 A1    Sep. 25, 2008

Related U.S. Application Data

(63) Continuation of application No. 11/034,562, filed on Jan. 13, 2005, now abandoned.

(51) Int. Cl.
  *G06F 3/12* (2006.01)
(52) U.S. Cl. .............. 358/1.15; 358/1.13; 358/1.1; 358/501; 358/540; 399/54; 270/1.01; 270/58.31; 270/58.32; 270/58.01; 270/58.03
(58) Field of Classification Search .............. 358/1.15, 358/1.13, 1.1, 501, 540; 399/84; 270/1.01, 270/58.31, 58.32, 58.01, 52.03
See application file for complete search history.

(56) References Cited

U.S. PATENT DOCUMENTS

| 5,316,279 | A  | * | 5/1994 | Corona et al. | 270/1.01 |
| 6,538,770 | B1 | * | 3/2003 | Mestha | 358/1.9 |
| 6,674,540 | B1 | * | 1/2004 | Wiechers et al. | 358/1.15 |

* cited by examiner

*Primary Examiner*—David K Moore
*Assistant Examiner*—Benjamin O Dulaney
(74) *Attorney, Agent, or Firm*—Yee & Associates, P.C.; William H. Steinberg

(57) ABSTRACT

An arrangement is provided wherein a printer used with a host device is operated to generate print batch separator pages using the same blank sheets as are used to print respective pages of successive print jobs. The printer is directed to print a visually distinctive graphic indicator, such as a separator border, trim, header, visible banner or other visual indicator or markings. This eliminates the need for an additional printer separator page tray. Usefully, a host device is operated to generate a separator command in a specified PDL language. A printer control device receives the page separator PDL command, and software contained in the printer control converts the PDL command into a printer readable format (PRF). A printer component responsive to the PRF command then operates the printer to print the specified separator page.

20 Claims, 3 Drawing Sheets

APPARATUS AND METHOD FOR PROVIDING PRINTER SEPARATOR PAGES

This application is a continuation of application Ser. No. 11/034,562, filed Jan. 13, 2005, status pending.

BACKGROUND OF THE INVENTION

1. Technical Field

The invention disclosed and claimed herein generally pertains to an apparatus and method for providing printer separator pages, to divide or separate different documents or other discrete batches of printed pages. More particularly, the invention pertains to an apparatus of the above type wherein the same type of blank paper or sheets are used for both the separator pages and respective pages of the printed documents or batches. Even more particularly, the invention pertains to an apparatus of the above type wherein different visually distinguishable separator pages may be printed to identify the respective documents of different users, or of different host computers that use the same printer.

2. Description of Related Art

At present, both black ink printers and color printers may be provided with multiple paper trays, together with necessary software, in order to produce separator pages between different documents, or other batches of printed pages. A separator page is typically a colored sheet of paper, such as blue or yellow, that is inserted into a designated printer tray. The printer will print a header onto the colored paper when a user requests that a specified document or batch be printed. Immediately after the separator page has been printed, the specified print job is printed out on white paper, or on other paper that is different in color from the separator page. Thus, the separator page provides a simple but effective visual means to enable a user to readily distinguish respective pages of the specified print job from pages of another, immediately preceding print job.

Herein, the terms, "batch" and "print batch" are used to refer to all the pages collectively resulting from any discrete print job or printing task assigned to a printer. These include, without limitation, documents, single pages, multiple copies of the same page, and any other discrete sequence of pages, wherein respective pages are to be kept together.

Notwithstanding its benefits, there are a number of problems with the above present approach for producing separator pages. For example, a user could run out of colored paper and be forced to put white paper into the separator tray. This could also happen inadvertently. In either case, the resulting separator page would be of very limited benefit, since the boundary between two successively printed batches could generally not be determined by quick visual inspection. Alternatively, a user could run out of white paper and be forced to print desired documents or other batches on the colored separator paper. Once again, it would not be easy to quickly distinguish between the separator page and the pages of adjacent printed batches. Moreover, the present approach requires two separate trays that must both be kept supplied with paper to ensure proper operation. This, in turn necessitates additional time and effort, and extra hardware will generally be needed to support operation of the additional separator paper tray. The additional hardware tends to increase printer cost and maintenance requirements.

SUMMARY OF THE INVENTION

In accordance with the invention, a printer used with a computer system, or other host device, is operated to generate print batch separator pages using the same blank paper or sheets as are used to print respective pages of successive batches. The blank sheets used may be white or may be some other color. The printer is directed to print a separator border, trim, header, visible banner or other visual indicator or markings. Thus, the need for an additional separator page tray for a printer, as well as the hardware mechanisms and linkages required therefor, is eliminated in embodiments of the invention. One such embodiment is directed to an apparatus for operating a printer to print successive first and second print batches using blank sheets that, prior to printing, appear to be substantially identical. The system comprises a host device operable to generate a separator command in a specified page description language, and a printer control device coupled to receive the page separator command. The system further comprises a computer readable medium contained in the printer control and provided with software configured for use in converting the page separator command into a format readable by the printer. A printer component is disposed to receive the page separator command in the printer readable format, and to operate the printer in response to the printer command to print a separator page on one of the sheets that is visually distinct, at least, from both the last page of the first batch and the first page of the second batch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
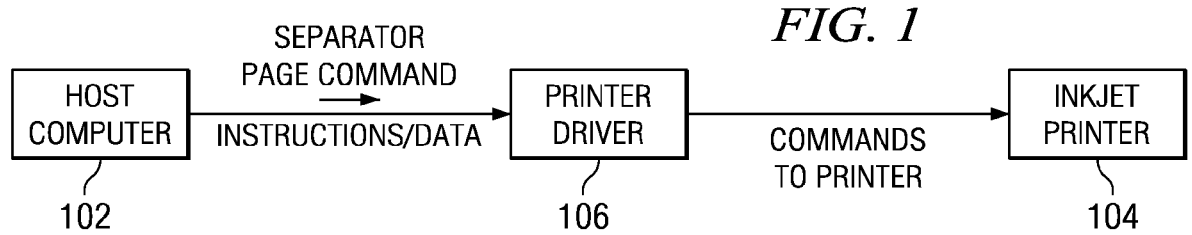
FIG. 1 is a block diagram showing delivery of print commands to an inkjet printer from a host computer connected thereto.

Referring to FIG. 1, there is shown a host computer 102 connected to submit a print job, comprising instructions and data to be printed, to an inkjet printer 104. For an inkjet printer, the application being used by the computer 102 must first send the data to be printed to a printer driver 106. The driver converts or translates the data into a format that the printer can understand, and checks to see that the printer is online and available to print. The data is then sent by the driver from the computer to the printer via a connection interface such as a parallel port or USB port.

To print a separator page in accordance with an embodiment of the invention, a user of host computer 102 could first select Print menu, then select Properties therefrom and then select Separator Page. Upon executing the Separator Page command, the printer would be instructed or commanded to print a separator page. More particularly, the printer would be commanded to use a sheet of white document paper to print a visual indicator or other marking on the separator page. The visual indicator could comprise an element such as a border, trim, grid, header, or a visual banner. It is anticipated that for a printer using black ink to print on white paper, any such visual indicators would suffice to make a separator page readily distinguishable from adjacent documents or other printer pages.

Moreover, by proper configuration of the controlling software, the printer could be adapted to selectively change or vary the appearance of the border, header or other visual indicator, to produce visually different separator pages. The different separator pages could then be used to readily identify or distinguish between different users or different print jobs. For example, the separator pages could be coded based on user identification (ID), or on the name of the print job submitter. In one example, persons having names that start with A-C could have a diagonal striped pattern. The next three could have a horizontal dash pattern, and so on.

For color printers, a number of additional software based features may be made available. For example, a separator page could be printed having a blue color background with black wording, to make it appear similar to what would have been printed on a blue page if the printer had a separate separator paper tray with blue paper. Also, different color coded separator pages could be printed, based on the user ID or name of the print job submitter. For example, those that had names starting with A-C could be printed with a red background, the next alphabetical group could have a blue background and so on. More generally, color printers could provide separator pages printed with different selected background colors, border colors, grid patterns and solid colors, or mixtures of colors for patterns, headers and wording.

For both color and black ink printers, further variations could be provided for separator pages, if the printer has double sided printing capability.

Figure 2:
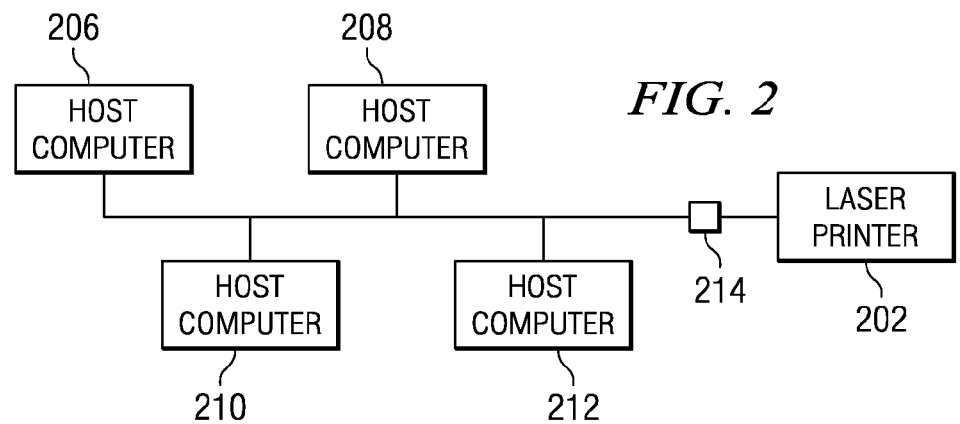
FIG. 2 is a block diagram showing a printer configuration, wherein a community laser printer connected to serve multiple host computers is operable in accordance with an embodiment of the invention.

Referring to FIG. 2, there is shown a printer 202, usefully comprising a laser printer, connected to host computers 206-212, through a printer controller 214. Thus, printer 202 serves as a community printer, to provide printing services for multiple users. Each of the host computers communicates with the printer control 214 through a connection interface such as parallel port or a USB port.

The control 214 could be shown to reside within printer 202, but has been shown external thereto in FIG. 2, to emphasize its essential role in communication between the host computers 206-212 and the printer 202. The printer controller 214 serves as the main computer for the printer 202, and may have to periodically start and then stop a connected host computer, to process the information received therefrom. The controller 214 handles each connected host computer separately, but may exchange data with different host computers on a concurrent basis. In laser printers such as printer 202, it is common for the controller to save print job data in its own memory. This allows the control to put different printing jobs into a queue, so that it can work through them one at a time. This also saves time when printing multiple copies of a document, since the host computer needs to send the data out to the printer only once.

In order for the printer controller 214 and one of the host computers 206-212 to communicate, they need to speak the same page description language (PDL). At present, a user may have to select a font from hundreds of different fonts, or may desire to print a complex graphic. Accordingly, printer 202 must be able to communicate in a comparatively advanced language. Some of these languages describe a page in vector form, that is, as mathematical values of geometric shapes. The printer controller receives the vector image language, or other PDL language, and converts it into a bit map page, which comprises a series of very small dots. With this system, the printer can receive elaborate or complex pages, picturing any sort of font or image. Moreover, the printer controller 214 must organize all of the data it receives from the host computer. This includes all of the commands that tell the printer 202 what to do, such as what paper to use, how to format the page and what font to use.

Figure 3:
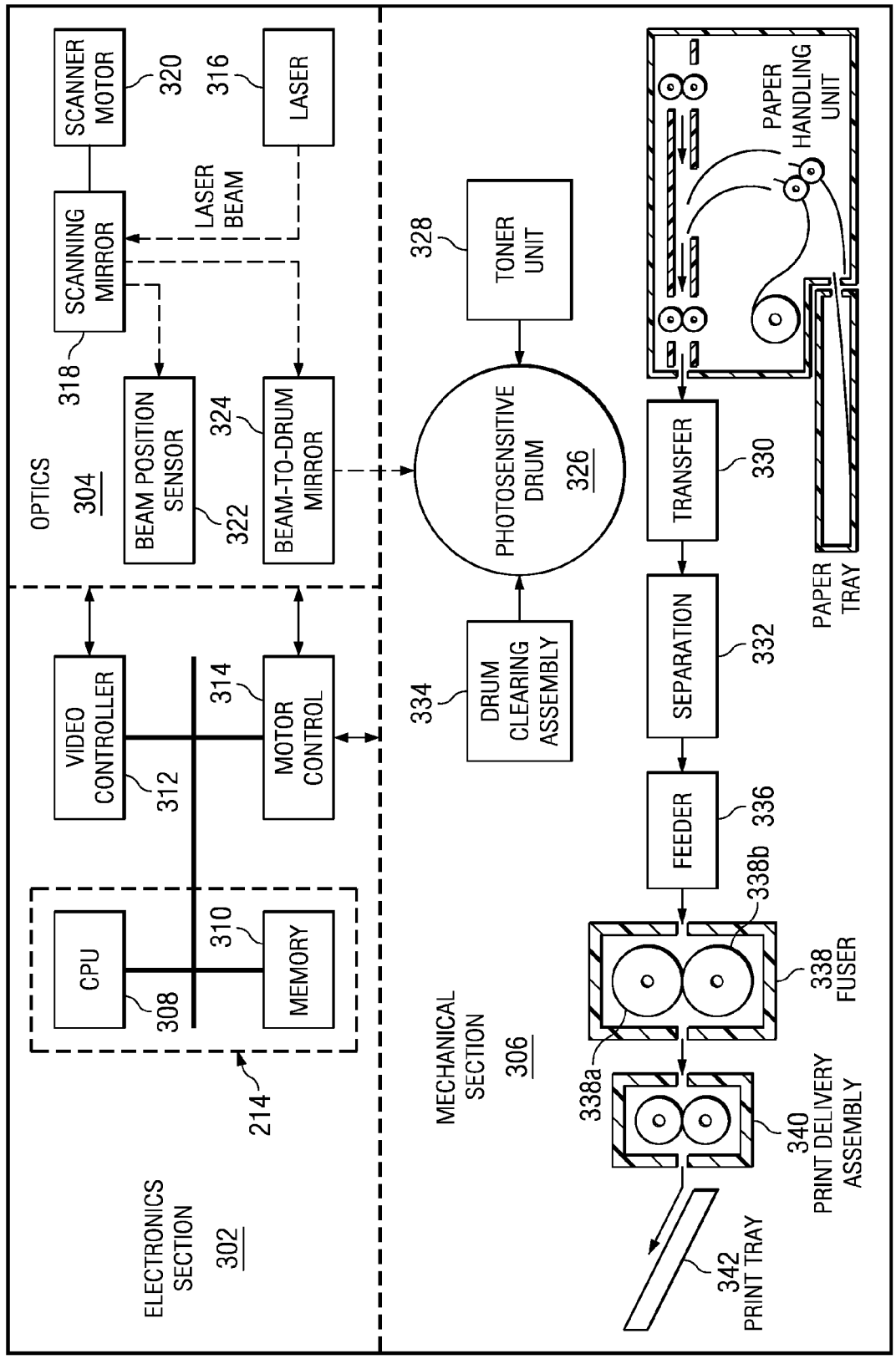
FIG. 3 is a block diagram showing the laser printer of FIG. 2 in further detail.

Referring to FIG. 3, there is shown laser printer 202 generally comprising an electronic section 302, optics 304 and a mechanical section 306. Electronics 302 includes printer controller 214, provided with a CPU 308 and a memory 310, a video controller 312 and a motor controller 314. Motor controller 314 is provided to control operation of motors and movement of mechanical components of printer 202.

Optics 304 includes a laser 316, a scanner mirror 318 operated by a scanner motor 320, a beam position sensor 322 and a beam to drum mirror 324. The laser 316 receives page data, one line at a time, through the video controller 312. The page data received by the laser is in the form of bit map image data, and thus comprises a pattern of tiny dots as described above. The laser emits a pulse of light for each dot to be printed, and emits no pulse for each dot of blank space. The emitted laser signal is projected to scanning mirror 318, and is then directed by mirror 318 to the beam to drum mirror 324.

Respective optics components act to scan the beam projected by laser 316, comprising a line of page data, along the surface of a rotating photosensitive drum 326 of mechanical section 306. Initially, drum 326 is given a total positive charge. As the drum revolves, the laser beam projected across the surface discharges points on the surface contacted by the emitted laser pulses, so that such points become negatively charged. In this way, the laser "draws" the letters and images to be printed as a pattern of electrical charges, so that the pattern comprises an electrostatic image. After the pattern is set on the drum, a coating of positively charged toner is applied thereto, the toner comprising a fine black powder. Since it has a positive charge, the toner clings to the negatively discharged areas of the drum 326, but not to the positively charged background areas of the drum. When the powder pattern is affixed to the drum surface, the drum 326 rolls over a page sheet (not shown), which is moving along a drum 326. Before the paper is moved under the drum, it is given a negative charge by the transfer roller 330. This charge is stronger than the negative charge of the electrostatic image, so that the paper can pull the toner powder away from the drum surface. Since it is moving at the same speed as the drum 326, the paper picks up the image pattern exactly. To keep the paper from clinging to the drum, it is discharged by separation roller 332, immediately after picking up the toner. The drum clearing assembly 334 then prepares the surface of the drum to receive another line of page data from a scanned laser beam.

After receiving the toner, a feeder 336 directs the paper through a fuser 338, comprising a pair of heated rollers 338a and 338b. As the paper passes through these rollers, the loose toner powder melts, fusing the toner with the fibers of the paper. The fuser 338 and printer delivery assembly 340 then act to move the paper to the print output tray 342.

Figure 4:
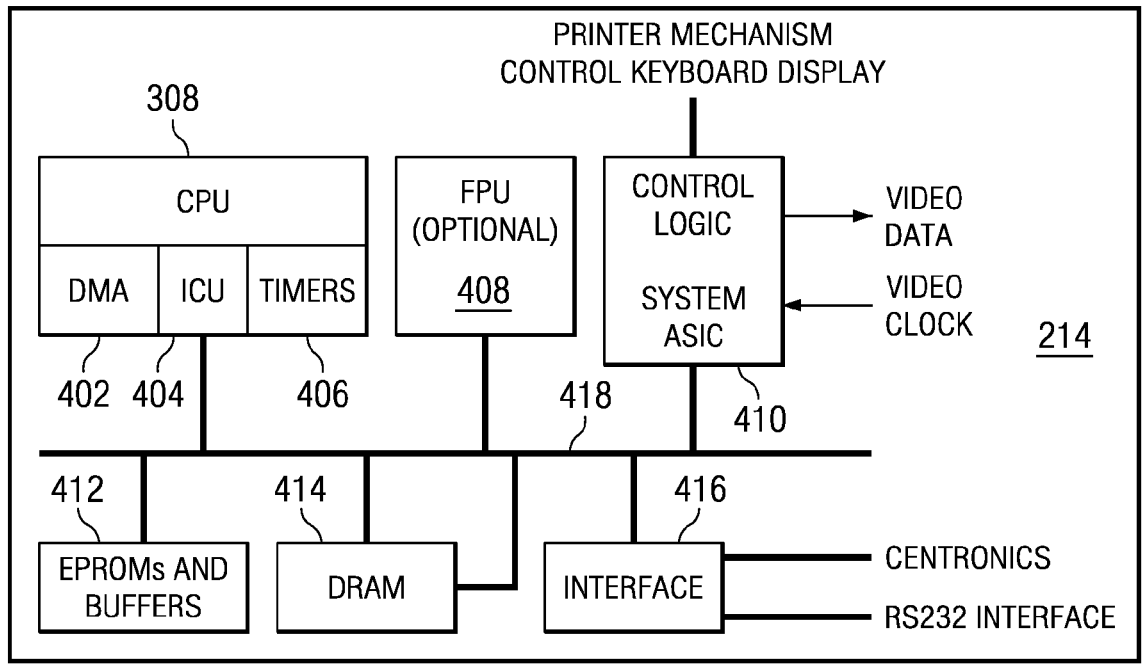
FIG. 4 is a block diagram showing a control for the printer of FIG. 2.

Referring to FIG. 4, there are shown principal components of printer controller 214. The CPU 308 thereof is shown provided with a DMA Controller (DMA) 402, an Interrupt Control Unit (ICU) 404 and a number of timers 406. Floating Point Unit (FPU) 408 may be optionally included. The control logic 410 comprises a video shifter, a printer mechanism control, and a keyboard display control which may be respectively implemented in a system ASIC. The controller memory includes EPROMS and buffers 412 and a DRAM 414. A controller interface usefully includes both an RS232 interface and a centronics connector, which is commonly used for parallel printer interfaces. Respective components of controller 214 are interconnected by means of a bus 418.

As stated above, printer controller 214 performs computation and control tasks aimed at converting images, provided by a connected host computer and a page description language (PDL) format, into a bit map image that is sent to the printer optics and mechanical section. The PDL contains the instruction needed to create the image to be printed on a page, a task that may require a high performance 32-bit CPU. Once the data has been structured, the controller begins putting the page together. It sets the text margins, arranges the words and places in any specified graphics. When a page is arranged, the controller takes the page data, either as a whole or piece by piece, and breaks it down into the array of tiny dots comprising the bit map image.

It will be readily apparent that the above procedure will be followed by the controller 214, in preparing a selected graphic or visual indicator for printing on a separator page, in accordance with embodiments of the invention.

Figure 5:
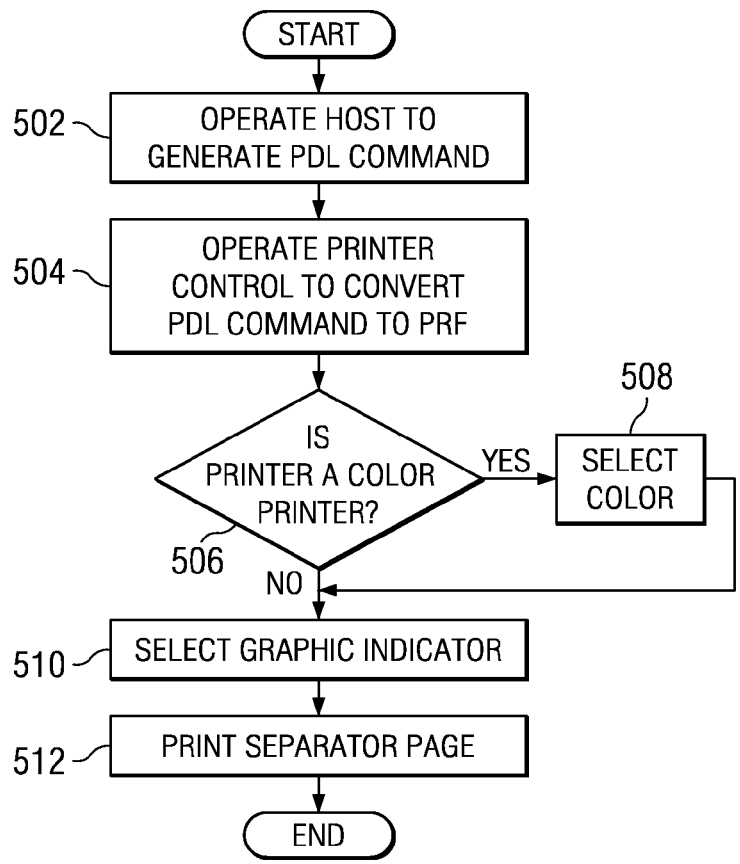
FIG. 5 is a flowchart illustrating steps of an embodiment of the invention.

Referring to FIG. 5, there is shown a function block 502 indicating that a host computer is operated to generate a PDL command to print a separator page. Function block 504 shows the command converted to a printer readable format (PRF) by the printer control. It is to be understood that "printer control", as used herein, is intended to be a generic term referring, for example, to devices such as printer driver 106 of inkjet printer 104, and to devices such as printer controller 214 of laser printer 202, but not limited to these types of printers.

Referring further to FIG. 5, decision block 506 indicates that it is necessary to consider whether or not the associated printer is a color printer. If not, the separator page command will direct the printer to set up a particular graphic or visual indicator for imprinting, as shown by function block 510, to create the intended separator page. If the printer is a color printer, the separator page command will first specify a color or colors to the printer for respective features of the graphic indicator, as shown by function block 508. After the graphic indicator has been selected, the separator page is printed, as indicated by function block 512.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Apparatus for use with a printer operable to successively print a first print batch and then a second print batch using blank sheets that are substantially identical in appearance with one another, said apparatus comprising:
   - a host device operable to generate a page separator command in a specified page description language;
   - a printer controller coupled to receive said page separator command;
   - a computer readable medium contained in said printer controller, said computer readable medium provided with software configured for use in converting said page separator command into a format readable by said printer;
   - a component in said printer disposed to receive said page separator command in said printer readable format and to operate said printer in response to said page separator command to print one or more specified visual indicators onto one of said blank sheets to form a separator page, wherein said separator page is visually distinct at least from both a last printed page of said first print batch and a first printed page of said second print batch, and wherein said separator page is coded with different geometric patterns to distinguish between different users, and wherein the different geometric patterns are associated with a set of users that are pre-grouped alphabetically according to the set of users' names; and
   - a single paper feed mechanism provided to feed all of said blank sheets to said printer for printing.

2. The apparatus of claim 1, wherein:
   said separator page is one of a plurality of separator pages printed at different positions in a sequence of printed pages, each of said separator pages being visually distinct from every other separator page, and each of said separator pages being positioned to divide respective pages of a corresponding print batch from pages of an adjacent print batch.

3. The apparatus of claim 2, wherein:
   said printer receives print jobs from a plurality of users, and a particular separator page associates a particular user with a print batch immediately adjacent to said particular separator page.

4. The apparatus of claim 1, wherein:
   said printer is selected from a group that includes at least laser printers and inkjet printers.

5. The apparatus of claim 1, wherein:
   said printer prints said separator page using ink of a same color that is used to print respective pages of print batches separated by said separator page.

6. The apparatus of claim 1, wherein:
   said printer prints said separator page using ink of a different color from the ink used to print respective pages of print batches separated by said separator page.

7. The apparatus of claim 1, wherein:
   all of said blank sheets are of a same color prior to use thereof in the printing.

8. A method for use with a printer operable to successively print a first print batch and then a second print batch using blank sheets that are substantially identical in appearance with one another, said method comprising the steps of:
   operating a host device to generate a page separator command in a specified page description language;

coupling said page separator command to a printer controller;

using said printer controller to convert said page separator command into a format readable by said printer;

operating said printer in response to said page separator command in said printer readable format to print one or more specified visual indicators onto one of said blank sheets to form a separator page, wherein said separator page is visually distinct at least from both a last printed page of said first print batch and a first printed page of said second print batch, and wherein said separator page is coded with different geometric patterns to distinguish between different users, and wherein the different geometric patterns are associated with a set of users that are pre-grouped alphabetically according to the set of users' names; and feeding all of said blank sheets to said printer for printing from a single paper feed mechanism.

9. The method of claim 8, wherein:

said separator page is one of a plurality of separator pages printed at different positions in a sequence of printed pages, each of said separator pages being visually distinct from every other separator page, and each of said separator pages being positioned to divide respective pages of a corresponding print batch from pages of an adjacent print batch.

10. The method of claim 8, wherein:

said printer receives print jobs from a plurality of users, and a particular separator page associates a particular user with a print batch immediately adjacent to said particular separator page.

11. The method of claim 8, wherein:

said printer is selected from a group that includes at least laser printers and inkjet printers.

12. A non-transitory computer readable medium encoded with computer executable instructions for use with a printer operable to successively print a first print batch and then a second print batch using blank sheets that are substantially identical in appearance with one another, said non-transitory computer readable medium comprising:

first computer executable instructions for operating a host device to generate a page separator command in a specified page description language;

second computer executable instructions for coupling said page separator command to a printer controller;

third computer executable instructions for using said printer controller to convert said page separator command into a format readable by said printer;

fourth computer executable instructions for operating said printer in response to said page separator command in said printer readable format to print one or more specified visual indicators onto one of said blank sheets to form a separator page, wherein said separator page is visually distinct at least from both a last printed page of said first print batch and a first printed page of said second print batch, and wherein said separator page is coded with different geometric patterns to distinguish between different users, and wherein the different geometric patterns are associated with a set of users that are pre-grouped alphabetically according to the set of users' names; and fifth computer executable instructions for operating a single paper feed mechanism to provide all of said blank sheets to said printer for printing.

13. The non-transitory computer readable medium of claim 12, wherein:

said separator page is one of a plurality of separator pages printed at different positions in a sequence of printed pages, each of said separator pages being visually distinct from every other separator page, and each of said separator pages being positioned to divide respective pages of a corresponding print batch from pages of an adjacent print batch.

14. The non-transitory computer readable medium of claim 12, wherein:

said printer receives print jobs from a plurality of users, and a particular separator page associates a particular user with a print batch immediately adjacent to said particular separator page.

15. The non-transitory computer readable medium of claim 12, wherein:

said printer is selected from a group that includes at least laser printers and inkjet printers.

16. The method of claim 8, wherein:

said printer prints said separator page using ink of a same color that is used to print respective pages of print batches separated by said separator page.

17. The method of claim 8, wherein:

said printer prints said separator page using ink of a different color from the ink used to print respective pages of print batches separated by said separator page.

18. The method of claim 8, wherein:

all of said blank sheets are of a same color prior to use thereof in the printing.

19. The non-transitory computer readable medium of claim 12, wherein:

said printer prints said separator page using ink of a same color that is used to print respective pages of print batches separated by said separator page.

20. The non-transitory computer readable medium of claim 12, wherein:

said printer prints said separator page using ink of a different color from the ink used to print respective pages of print batches separated by said separator page.

* * * * *